US007318465B1

(12) United States Patent
Hui

(10) Patent No.: US 7,318,465 B1
(45) Date of Patent: Jan. 15, 2008

(54) HANDHELD REINFORCER RING APPLICATOR

(76) Inventor: John Hui, 5 Hutton Centre Dr., Suite 830, Santa Ana, CA (US) 92707

( * ) Notice: Subject to any disclaimer, the term of this patent is extended or adjusted under 35 U.S.C. 154(b) by 129 days.

(21) Appl. No.: 11/356,831

(22) Filed: Feb. 21, 2006

Related U.S. Application Data

(63) Continuation-in-part of application No. 11/092,079, filed on Mar. 29, 2005, now Pat. No. 7,172,007.

(51) Int. Cl.
*B32B 37/10* (2006.01)

(52) U.S. Cl. ...................... 156/540; 156/539; 156/564; 156/579

(58) Field of Classification Search ................ 156/391, 156/538, 539, 540, 564, 579, 580, 581; 277/572, 277/575, 585; 269/909
See application file for complete search history.

(56) References Cited

U.S. PATENT DOCUMENTS

| | | | |
|---|---|---|---|
| 4,028,170 A | 6/1977 | Savarimuthu | |
| 4,289,565 A | 9/1981 | Wilkins | |
| 4,713,995 A | 12/1987 | Davi | |
| 4,746,394 A | 5/1988 | Sueta et al. | |
| 5,340,229 A | 8/1994 | Schwartzman | |
| 5,658,421 A | 8/1997 | Carroll | |
| 6,106,915 A | 8/2000 | Ruben | |
| 6,206,070 B1 * | 3/2001 | Salmon | 156/513 |
| 6,789,593 B1 | 9/2004 | Aono et al. | |
| 6,863,108 B1 * | 3/2005 | Hui | 156/513 |

* cited by examiner

*Primary Examiner*—James Sells
(74) *Attorney, Agent, or Firm*—Cislo & Thomas, LLP

(57) ABSTRACT

A reinforcement ring applicator for sequentially applying a plurality of reinforcement rings about prepunched holes in a sheet of paper employs a removable and replaceable cartridge containing a stack of reinforcement rings releaseably attached to the lower end of a plunger. The cartridge is equipped with a pressure pad or plate for exerting downward pressure on the stack of reinforcement rings, a collar secured to the top of the pressure pad and releaseably coupled to the plunger, and a central core. The lower extremity of the cartridge core has a plurality of outwardly directed toes that support the stack of reinforcing rings from beneath. The upper portion of the core has a plurality of barbs inclined downwardly and outwardly. With each downward stamping action of the plunger, the core is forced incrementally upwardly, thus releasing the lowermost reinforcement ring which is applied by pressure sensitive adhesive to a sheet of paper about a prepunched hole therein. With the application of each reinforcing ring, the core is pushed upwardly through a gripping flange on the cartridge collar. Once all of the reinforcing rings have been depleted a fresh cartridge with a fresh supply of reinforcing rings is attached to the lower end of the plunger.

20 Claims, 6 Drawing Sheets

HANDHELD REINFORCER RING APPLICATOR

The present application is a continuation in part of U.S. application Ser. No. 11/092,079 filed Mar. 29, 2005 now U.S. Pat. No. 7,172,007.

BACKGROUND OF THE INVENTION

1. Field of the Invention

The present invention relates to a handheld device for applying flat, annular reinforcing rings about apertures already punched in sheets of material, such as paper.

2. Description of the Prior Art

For years a problem has existed in that considerable stress is often applied to the structure of papers fastened in files in the area immediately surrounding holes punched in the paper near the paper edge. The structure of the papers then tears through the short distance of material between the holes and the edges of the sheets of paper near which the holes are formed. When this occurs the sheets are no longer retained firmly in the file or binder in which they are stored.

One system that has been available for many years for remedying this situation is the use of flat, annular reinforcing rings that may be secured to the areas surrounding the punched holes. These reinforcing rings are typically formed of a material of greater strength than the paper or other sheet material in which the holes are punched. The reinforcing rings are coated with either a moisture-sensitive or pressure-sensitive adhesive and are applied to the sheets of paper or other material about holes formed therein once the holes have been punched.

The principal problem with this prior arrangement is that it has historically been performed manually. The task of reinforcing punched holes in the hundreds, and even thousands, of sheets of paper that are secured in files by the manual application of such reinforcing rings is often so labor intensive as to be impractical. Consequently, this system of reinforcement, while used to some extent, is not prevalent.

Various reinforcing ring applicators have been devised for concurrently punching perforations in sheets of material such as paper or plastic, so that these sheets may be held within an office filing article such as a ring binder or a file folder employing pronged fasteners. Such conventional combination punchers and reinforcers typically employ punching mechanisms that are operated by a lever to form one or more perforations in a sheet of material, and a reinforcer application system for contemporaneously reinforcing an area surrounding the perforations. The articles providing reinforcement may take the form of patches of adhesive tape or annular, reinforcing wafers with a pressure-sensitive adhesive thereon.

While the combination hole punchers and reinforcers are quite useful, often the need for reinforcement of the edges of sheets of paper and other material in which perforations have been formed does not become apparent until after the holes have been punched. Consequently, a need exists for a simple system for quickly and economically applying reinforcement rings about existing perforations in sheet material.

One device that is highly advantageous for applying reinforcement rings of this type about existing perforations in sheets of material is described in my prior U.S. application Ser. No. 11/092,079 filed Mar. 29, 2005 now U.S. Pat. No. 7,172,007, which is hereby incorporated by reference in its entirety. This prior system employs a handheld, spring loaded reinforcer in which a supply of a plurality of flat, annular reinforcing rings are engaged by friction on the corrugated surface of a mounting post and advanced along the post. The device has a lower tip with fingers which deflect radially inwardly upon depression of a plunger. However, I have since created a handheld reinforcement ring applicator that is even more reliable in its operation.

SUMMARY OF THE INVENTION

The reinforcement ring applicator of the present invention employs a detachable cartridge of reinforcement rings that are held on a central core member by means of a plurality of radially outwardly directed toes at the lower extremity of lower core member. The toes extend outwardly only a very short distance beneath the structure of the rings so that the rings are supported from beneath in a stack, but only at very narrow, opposing locations. The rings are sufficiently resilient so that downward pressure on the rings from above by a plunger holds the lowermost ring in position pressed against a sheet of material, such as paper, located therebeneath. The reinforcement ring is centered on an aperture in the sheet of paper so that the central opening in the lowermost ring is coaxially aligned with the center of a circular, punched out hole in the paper.

The cartridge includes an annular pressure plate disposed about the central cartridge core and located directly above the stack of reinforcing rings. Upon depression of the plunger the pressure plate pushes downwardly upon the stack of rings. The upper portion of the central core is formed as a stem with downwardly and outwardly inclined barbs on it. Above the pressure plate there is a collar that has a radially inwardly directed flange at its upper extremity that encircles the stem and resides in a very slightly overhanging relationship relative to the barbs on the stem.

The core of the cartridge is held centered relative to the pressure plate or pad by means of the radially inwardly directed flange located at the upper extremity of the collar. The flange engages the stem, initially near the uppermost barb, and between longitudinally adjacent barbs. The stem is pushed incrementally up through the collar as the reinforcement rings are dispensed one by one from the cartridge.

As the plunger is depressed, downward pressure is exerted around the area of the reinforcement rings, the reinforcement rings have a certain degree of resiliency. As a consequence, with pressure applied by the pressure pad, the lowermost reinforcement ring is forced downwardly past the outwardly directed toes that otherwise support it from beneath.

As pressure is applied to the reinforcement rings, the central core is forced upwardly in an incremental movement relative to the pressure pad and relative to the collar attached to the top of the pressure pad. The extent of interference between the annular flange of the collar and the barbs on the stem of the core is so slight that the flange can be deflected and the stem forced upwardly in an incremental movement with each plunger stroke that causes application of pressure and dispensation of a reinforcement ring from the cartridge. The downward slope of the barbs allows the stem of the core to be pushed upwardly in incremental steps as each reinforcement ring is dispensed from the core. The structure of the reinforcement rings is resilient enough to allow movement of the supporting toes up through the center of the lowermost reinforcement ring with each application of pressure on the stack of rings. By advancing the core upwardly relative to the pressure plate and retaining collar, the reinforcement rings can be dispensed, one at a time, and are secured to the sheet of paper or other sheet material therebeneath due to the pressure-sensitive adhesive on the underside of each reinforcement ring. Stepwise advancement of the core upwardly through the center opening in each ring as it becomes the lowermost ring allows the reinforcement rings to be applied, one at a time, about prepunched apertures in the sheet material.

In one broad aspect the present invention may be considered to be a reinforcement ring applicator for sequentially applying a plurality of reinforcement rings from a stack of such rings. Each of the rings has an underside coated with a pressure-sensitive adhesive. The rings are applied sequentially to sheet material therebeneath.

The reinforcement ring applicator is comprised of a base, a plunger, a spring, and a cartridge containing a vertical stack of reinforcement rings. The base is formed with a hollow, tubular lower portion having a lower extremity forming an open mouth. The base also has an hollow, upper portion defining a plunger guide.

The plunger is mounted for longitudinal, reciprocal movement and is laterally constrained by the plunger guide of the base. The spring biases the plunger away from the open mouth of the base.

The reinforcer cartridge has a central core, an annular pressure plate or pad, and a hollow, annular collar. The central core has a lower member depending from a stem. The lower member has a lower extremity with a plurality of turned out toes that support the stack of rings. The stem has outwardly projecting and downwardly inclined barbs defined thereon. The annular pressure plate is disposed above the stack of reinforcing rings. The collar is supported upon the pressure pad and defines a radially inwardly directed stem-engaging element, which is preferably an annular flange. The stem-engaging element interacts with the stem to facilitate longitudinal passage of the barbs therethrough in a direction away from the pressure pad and to resist passage of the barbs therethrough in a direction toward the pressure pad.

In a preferred embodiment of the invention the lower member of the central core of the cartridge is formed with only a pair of diametrically opposed legs, each having a single, radially outwardly directed toe which has an outer, arcuately shaped peripheral edge. Preferably, the legs are joined together by a thin web that is located above the outwardly turned toes at the lower extremities of the legs.

The cartridge is preferably connected to the plunger by a releaseable coupling. In the preferred embodiment of the invention the collar is provided with a pair of diametrically opposed, outwardly projecting ears. The plunger is formed with trunnions that releaseably engage the ears on the collar so as to permit the cartridge to undergo a rocking movement about the ears relative to the plunger.

Preferably also there is a resilient cushion located between the pressure pad and the stack of reinforcers. This cushion serves to equalize pressure applied by the pressure pad across the surface of the reinforcers as the pressure pad is rocked relative to the plunger into an orientation precisely parallel to the plane of the sheet of paper to which the lowermost reinforcer is to be applied.

The base of the reinforcement ring applicator is preferably formed of rigid, molded, transparent plastic and has a lower portion formed with an inverted cup-shaped configuration. The lower edge of the lower portion of the base preferably has a circular, arcuate shape, but there are a pair of diametrically opposed finger access gaps defined at the bottom edge in the lower portion of the base. These finger access gaps allow a user to grip the cartridge from opposite sides between the thumb and forefinger of one hand so as to insert the cartridge onto the plunger, or to remove it from the plunger when the cartridge is spent and all of the reinforcement rings have been applied to sheets of paper.

Preferably, the reinforcement ring applicator is provided with a locator template at the mouth of the base. The locator template is provided with opposing, linearly aligned and oppositely directed visual alignment projections to facilitate proper manual positioning of the base. These alignment projections aid in positioning the base such that the cartridge resides at a predetermined distance in from a straight edge of a sheet of material to be reinforced. That is, hole punches for punching a pair of holes at the top of sheets of paper eight and a half inches in width have been standardized so that the centers of the punched apertures are located a distance of three-eighths of an inch from the edge of a sheet of paper when the paper is properly inserted into the two-hole punch. Likewise, conventional three-hole punches for punching apertures to receive the fasteners of a ring binder are also located three-eighths of an inch in from the eleven inch edge of the sheet of paper when the paper is properly placed in the punch. Consequently, in the preferred embodiment of the present invention the opposing visual edge alignment projections are linearly aligned with each other and extend in opposite linear directions and are located on a line that is three-eighths of an inch from the center of the axis of alignment of the cartridge. As a consequence, the opposing visual edge alignment projections can be positioned right at the edge of the sheet of paper so that the lowermost reinforcing ring will be applied a proper distance in from that edge.

Preferably also, the locator template includes at least one visual centering projection directed midway between the edge alignment projections. The centering projection indicates the center of axial alignment of the cartridge. The locator template thereby aids the user in properly positioning the handheld reinforcement ring applicator so that the lowermost reinforcement ring is accurately applied coaxially about the prepunched hole, about which reinforcement is desired.

In another aspect the invention may be considered to be a handheld hole reinforcer for applying reinforcer rings about holes in sheets of material. The handheld hole reinforcer of the invention is comprised of a base, a plunger mounted in the base, a spring acting between the plunger and the base, and a cartridge. The base is formed having a hollow, lower chamber with a downwardly facing open mouth, as well as a hollow, upper chamber. The plunger is mounted in the base for reciprocal movement toward and away from the mouth of the base. The plunger has a lower end that includes a releaseable coupling thereon. The springs acts between the plunger and the base to urge the releaseable coupling away from the mouth of the base.

The cartridge has a central core with an upwardly projecting barbed stem with downwardly and outwardly inclined barbs formed thereon. The core also includes a plurality of longitudinally extending legs depending from the stem and having lower extremities with outwardly turned toes. The toes at the lower extremities of the legs support a supply of a plurality of reinforcement rings, each having pressure-sensitive adhesive coated on its underside. The reinforcing rings are stacked atop one another.

The cartridge also includes a transversely extending pressure pad located above the legs. The pressure pad has a central opening through which the stem passes. An annular collar is supported atop the pressure pad and is releaseably engaged by the releaseable coupling of the plunger. The collar defines a radially inwardly projecting stem gripping ring that permits advancement of the barbed stem in a direction away from the mouth of the base and retards advancement of the barbed stem in a direction toward the mouth of the base. In this way downward pressure on the plunger toward the mouth of the base permits stepped, incremental, longitudinal movement of the barbed stem through the gripping ring of the collar. The stem moves toward the upper chamber of the base, thereby allowing the pressure pad to force the lowermost reinforcement ring in the stack downwardly past the toes at the lower extremities of the legs of the core. This permits the lowermost reinforcement ring to adhere to a sheet of material located therebeneath.

In still another aspect the invention may be considered to be a handheld reinforcement ring applicator for applying reinforcing rings to sheets of material about apertures therein comprising a hollow base, a plunger, a spring, and a reinforcer cartridge. The base has a lower support defining a reinforcer application plane. The base also has an upper guide column defining a cylindrical, annular, upwardly facing guide channel therein oriented perpendicular to the reinforcer application plane. The plunger has a downwardly projecting, cylindrical, annular guide sleeve located in the guide channel. The guide sleeve resides in laterally constrained, reciprocally removable engagement relative to the base. The spring is interposed between the base and the plunger and biases the plunger upwardly away from the reinforcer application plane.

The reinforcer cartridge includes a plurality of flat reinforcement rings, each having a pressure-sensitive adhesive on its undersurface. The cartridge is comprised of a transverse, annular pressure plate and a central core about which the plurality of reinforcement rings are coaxially mounted. The central core is formed with a plurality of depending legs, each having an outwardly facing toe at its lower extremity. The reinforcement rings are supported from beneath upon the toes at the lower extremities of the feet of the core. The reinforcement rings are sufficiently resilient so that they can be forced downwardly past the toes and free from the core, one at a time, to adhere to sheets of material therebeneath about the apertures defined therein. The core has an upwardly projecting shaft with downwardly and outwardly inclined barbs thereon.

The cartridge is further comprised of a collar mounted atop the pressure plate and releaseably coupled to the plunger. The collar has a central, axial aperture defined therein with a radially inwardly directed flange that surrounds and holds the core. The flange eases unidirectional advancement of the barbs on the shaft of the core upwardly therewithin in a direction away from the reinforcer application plane.

The invention may be described with greater clarity and particularity by reference to the accompanying drawings.

DESCRIPTION OF THE EMBODIMENT

Figure 1:
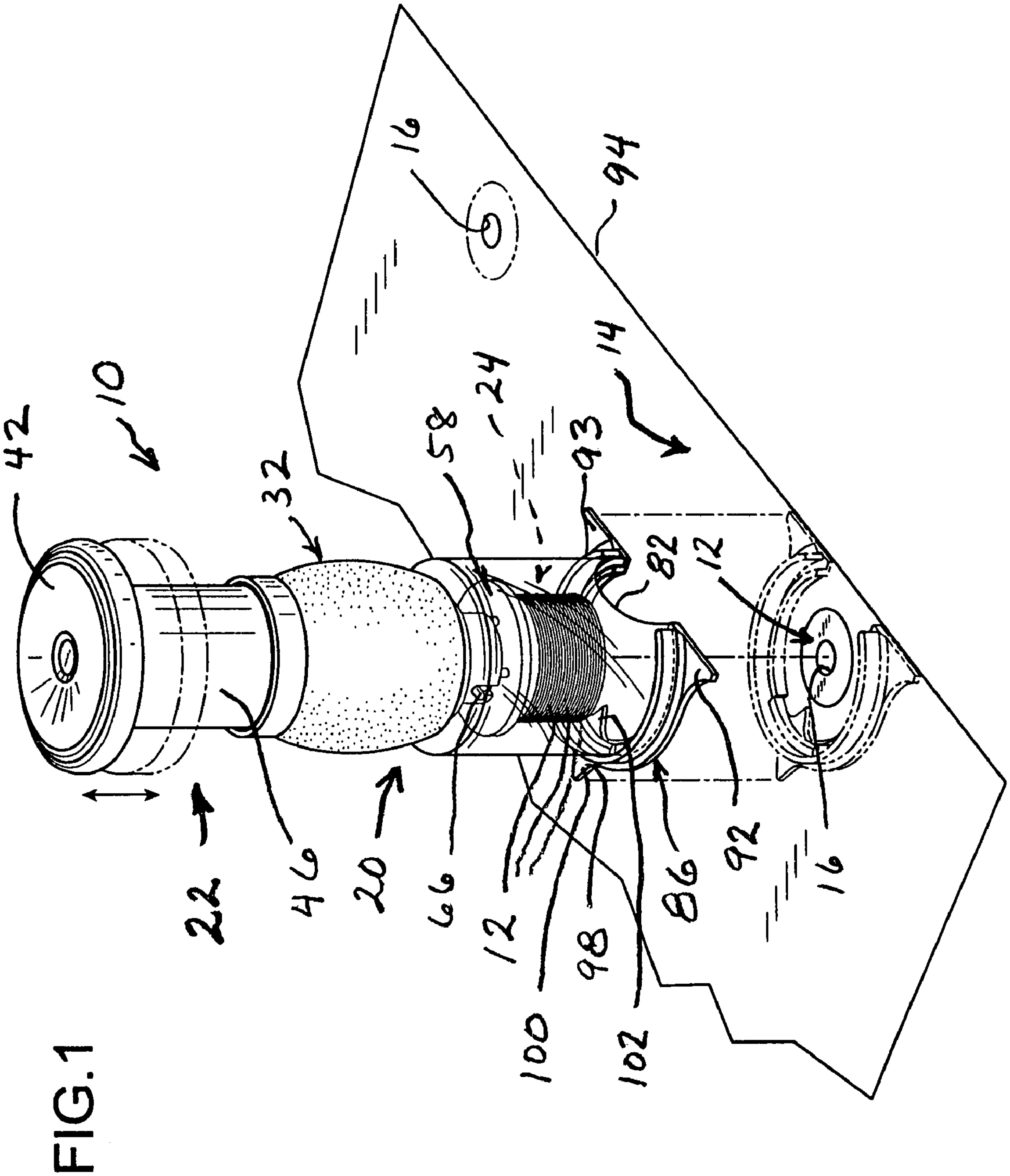
FIG. 1 is a perspective view illustrating a preferred embodiment of a handheld reinforcement ring applicator according to the invention and the use of that applicator.

FIG. 1 illustrates a handheld reinforcement ring applicator 10 for applying reinforcement rings 12 to sheets of material, such as the sheet of paper 14 shown, about apertures 16 defined in the sheet of paper 14. The reinforcement rings 12 are flat, flexible, annular discs or wafers which provide structural reinforcement to the sheet of paper 14 to prevent tearing due to stress exerted at the apertures 16 defined therein. The reinforcement rings 12 preferably have an inner diameter of one-quarter of an inch and an outer diameter of about three-quarters of an inch. The reinforcement rings 12 are conventional devices and need not be described in great detail.

The handheld reinforcement ring applicator 10 of the invention is comprised of a hollow base 20, a plunger 22, a spring 54, and a cartridge 24. The complete structure of the hollow base 20 is best illustrated in the sectional elevational drawings of FIGS. 3-6.

The hollow base 20 has a transparent, inverted cup-shaped lower support portion 26 that terminates in a lower arcuate edge 28 that defines a downwardly facing open mouth, indicated generally at 30. The base also has a hollow, upper chamber or portion 32 that includes an annular, resilient jacket 34 disposed coaxially about a cylindrical, annular upper wall 36 that surrounds an inner cylindrical guide column 38. Between the upright cylindrical wall 36 and the guide column 38, the upper portion 32 of the base 20 defines a narrow, cylindrical, annular, longitudinally elongated guide channel 40. The upright, cylindrical walls 36 and 38 of the upper base portion 32 and the slightly larger diameter lower portion 26 are unitarily molded of a rigid, transparent plastic.

The plunger 22 is formed with a generally disc-shaped flanged cap 42 from which a central cylindrical ram post 44 extends downwardly within the lateral confines of an outer cylindrical plunger guide sleeve 46. The guide sleeve 46 is of a size and shape to fit within the guide channel 40 and to move smoothly therewithin, keeping the plunger 22 coaxially centered relative to the base 20.

At its lower end the plunger 22 is provided with a cylindrical, annular guide tube 48 that has an inner diameter that establishes a friction fit against the outer surface of the lower portion of the central plunger post 44. At its lower end the guide tube 48 is formed with a radially outwardly directed annular limit flange 50. Below the limit flange 50 the cylindrical guide tube 48 is provided with a pair of diametrically opposed trunnion notches 52.

A compressed coil spring 54 is interposed between the plunger 22 and the base 20. The coil spring 54 has a lower end that seats in a spring seating channel defined in the upper end of the guide column 38. The upper end of the spring 54 seats in the annular gap defined between the central post 44 and the guide sleeve 46 of the plunger 22. As illustrated in FIGS. 3-6 the spring 54 serves to bias the plunger 22 upwardly, away from the mouth 30 of the base 20 and away from the sheet of paper 14.

The reinforcer cartridge 24 is comprised of a central core 56, a pressure pad or pressure plate 58, and an annular collar 60. The pressure pad 58 and the collar 60 are formed as parts of a unitary, rigid, molded plastic structure with the collar 60 supported atop the pressure pad 58 and connected thereto by a neck 62. At its upper extremity the collar 60 is provided with a radially inwardly directed, annular flange 64. On its exterior surface the collar 60 is provided with a pair of diametrically opposed, radially outwardly projecting ears 66. The ears 66 of the collar 60 fit within the trunnion notches 52 at the lower end of the plunger guide tube 48 with a releaseable, snap-fit connection. The plunger 22 is thereby provided with a releaseable coupling to engage the cartridge 24.

The central core 56 of the cartridge 24 has an upper portion formed as a relatively narrow stem 72 with a plurality of downwardly and outwardly inclined barbs 74 defined thereon. The barbs 74 have upper surfaces that are inclined downwardly and radially outwardly so that the stem 72 can be forced upwardly through the collar 60 without great difficulty. The radially inwardly projecting stem gripping ring or flange 64 is resilient enough so that it will deflect to permit passage of the stem 72 upwardly through the collar 60 and away from the mouth 30 at the lower end of the base 20. On the other hand, the configuration of the barbs 74 is such that the stem 72 cannot easily be forced downwardly in the opposite direction. The stem 72 is thereby mounted so that the flange 64 of the collar 60 interacts with the stem 72 to facilitate longitudinal passage of the barbs 74 therethough in a direction away from the pressure pad 58 and the mouth 30 of the base 20. The flange 64 of the collar 60 resists passage of the barbs 74 therethrough in a direction toward the pressure pad 58 and the mouth 30 of the base 20.

Figure 7:
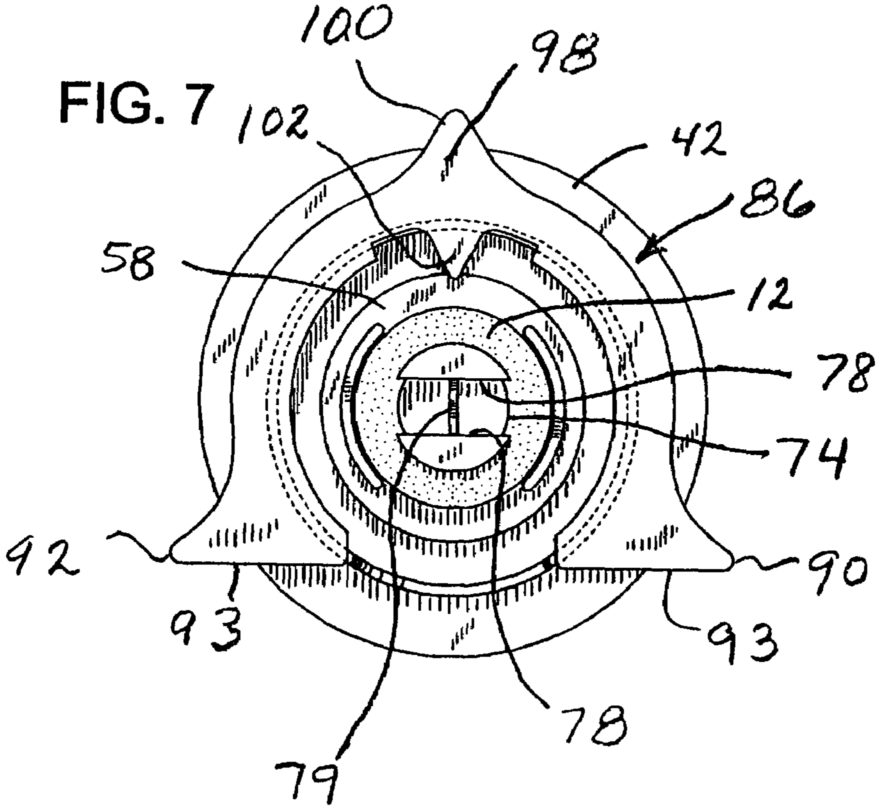
FIG. 7 is a bottom plan view of the handheld reinforcement ring applicator of the invention.

The lower portion 70 of the core 56 is formed with a pair of diametrically opposed legs 78 separated from each other by a transverse web 79, as best illustrated in FIG. 7. Each of the legs 78 depends from the stem 72 and has a lower extremity with a turned out toe 81 that supports the stack of reinforcement rings 12. That is, the out turned toes 81 extend radially outwardly in diametric opposition from each other just a short distance so as to engage the inner peripheral portion of the lowermost ring 12 in the stack of rings in the cartridge 24. The toes 81 both have outer, arcuately-shaped peripheral edges.

The ears 66 that project radially outwardly from the collar 60 are received in snap-fitting engagement in the trunnion notches 52 at the lower end of the plunger guide tube 48. The trunnion notches 52 thereby form a releaseable coupling for releaseably engaging the cartridge 24. This releaseable coupling allows the cartridge 24 to rock relative to the plunger 22 about a transverse, horizontal axis of rotation that is parallel to the sheet of paper 14. This rotatable coupling allows a downward force from the plunger 22 to be applied uniformly across the surfaces of the reinforcing rings 12.

The uniformity of application of plunger force is further enhanced by the provision of a resilient, annular, disc-shaped foam force distribution washer 80 that is interposed between the stack of reinforcing rings 12 and the underside of the pressure pad 58. Downward force applied by the plunger 22 compresses the foam washer 80 about its circumference as required to equalize force across the entire annular area of the reinforcing rings 12.

At its lower edge 28 the lower cylindrical portion 26 of the base 20 is provided with a pair of diametrically opposed, concave downwardly facing finger access notches 82. Each notch 82 occupies an arc about three-quarters of an inch in length along the circumference of the lower edge 28 and extends upwardly away from the lower edge 28 a distance of approximately one-half inch. The purpose of the finger notches 82 is to facilitate attachment and detachment of the cartridge 24 to the trunnion notches 52 at the bottom of the plunger 22.

In order to attach and detach the cartridges 24, the handheld hole reinforcer 10 is turned upside down and the base 20 is forced as far as possible toward the flanged cap 42 of the plunger 22, fully compressing the spring 54. Compression of the plunger 22 into the base 20 pushes the lower portion of the cartridge 24 out of the mouth 30 of the base 20. The finger access notches 82 thereby allow the cartridge 24 to be gripped by a user by pinching it between the thumb and forefinger so that it may be either attached to or detached from the plunger 22.

The handheld hole reinforcer 10 is also provided with an arcuate indexing template or guide 86, best illustrated in FIGS. 1 and 7. The indexing guide 86 including an arcuate, upwardly facing channel 88 that fits onto the lower edge 28 of the cup-shaped lower portion 26 of the base 20 by force of friction. The indexing guide 86 is thereby releaseably attached to the lower edge 28 of the cup-shaped lower base member 26.

The indexing guide 86 includes a pair of visual edge alignment projections 90 and 92 which are linearly aligned with each other, but which project in mutually opposing directions and which are laterally displaced from the axis of alignment of the cartridge 24 a predetermined distance. When the handheld hole reinforcer 10 is utilized, as illustrated in FIG. 1, the visual edge alignment projections 90 and 92 are positioned at the edge of the sheet of paper 14, on either side of the punched hole 16. The cartridge 24 is thereby properly located at the precise distance required in from the edge 94 of the sheet of paper 14. The edge alignment projections 90 and 92 thereby provide a visual alignment reference for positioning the base 20 of the handheld hole reinforcing ring applicator 10 relative to the straight edge 94 of the sheet of paper 14 located therebeneath.

The indexing guide 86 is further comprised of a visual center alignment projection 98 that is oriented perpendicular to the edge alignment projections 90 and 92 and located equidistant therefrom. The visual center alignment projection 98 includes a pointed indicator 100 that is directed radially outwardly from the lower edge 28 of the base 20 and also a radially inwardly directed pointer 102 that is directed radially inwardly toward the axis of alignment of the cartridge 24. The visual center alignment projection 98 thereby aids the user in precisely aligning the axis of alignment of the plunger 22, and the cartridge 24 coupled thereto, with the center of the punched aperture 16.

Figure 2:
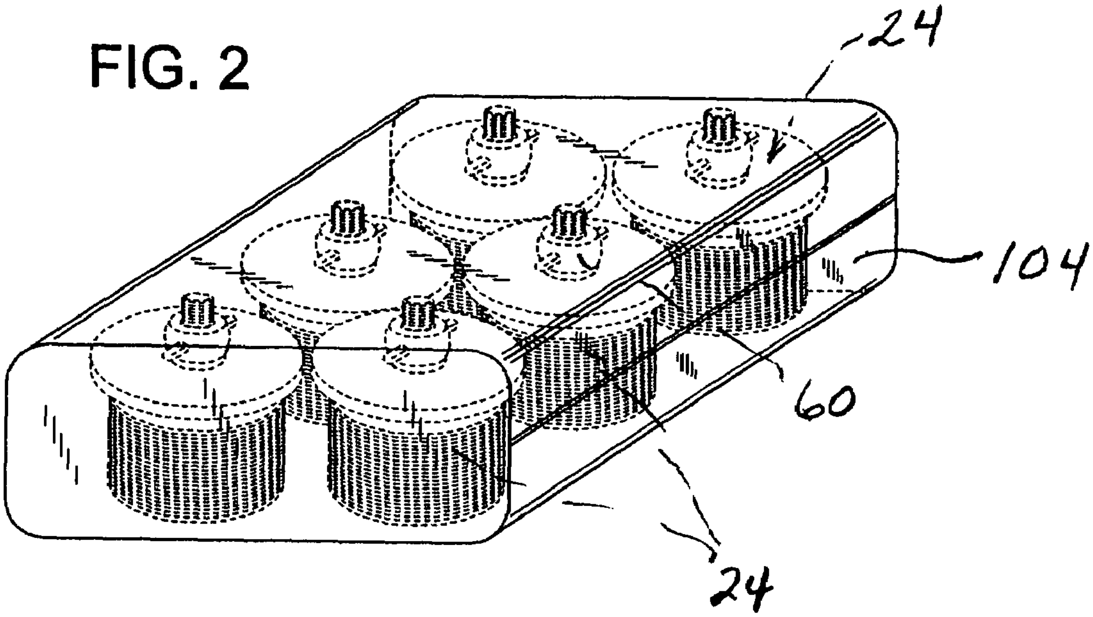
FIG. 2 is a perspective view illustrating a preferred packaging of a plurality of cartridges utilized as part of the handheld applicator of FIG. 1.

A plurality of cartridges 24 are preferably provided as renewal supply items, packaged together in a convenient container 104, as illustrated in FIG. 2. To install a cartridge 24 on the plunger 22, a cartridge 24 is removed from the container 104. The plunger 22 is inverted from the upright orientation shown in FIG. 4, and fully depressed into the base 20 until the finger grip notches 82 in the lower portion 26 of the base 20 are in approximate coplanar alignment with the trunnion notches 52 in the plunger guide tube 48. The cartridge 24 is then pushed toward the plunger 22 with the ears 66 on the collar 60 in alignment with the trunnion notches 52. The trunnion notches 52 and the ears 66 are configured so that the ears 66 slip into the notches 52 in a snap-fit arrangement. The plunger 22 is then released, thus allowing the spring 54 to retract the cartridge into the confines of the lower portion 26 of the base 20.

The indexing guide 86 is then fitted onto the lower edge 28 of the lower portion 26 of the base 20. The angular orientation of the indexing guide 86 relative to the ears 66 on the collar 60 is unimportant, since the reinforcing rings 12 have both a circular outer and circular inner perimeter.

Figure 3:
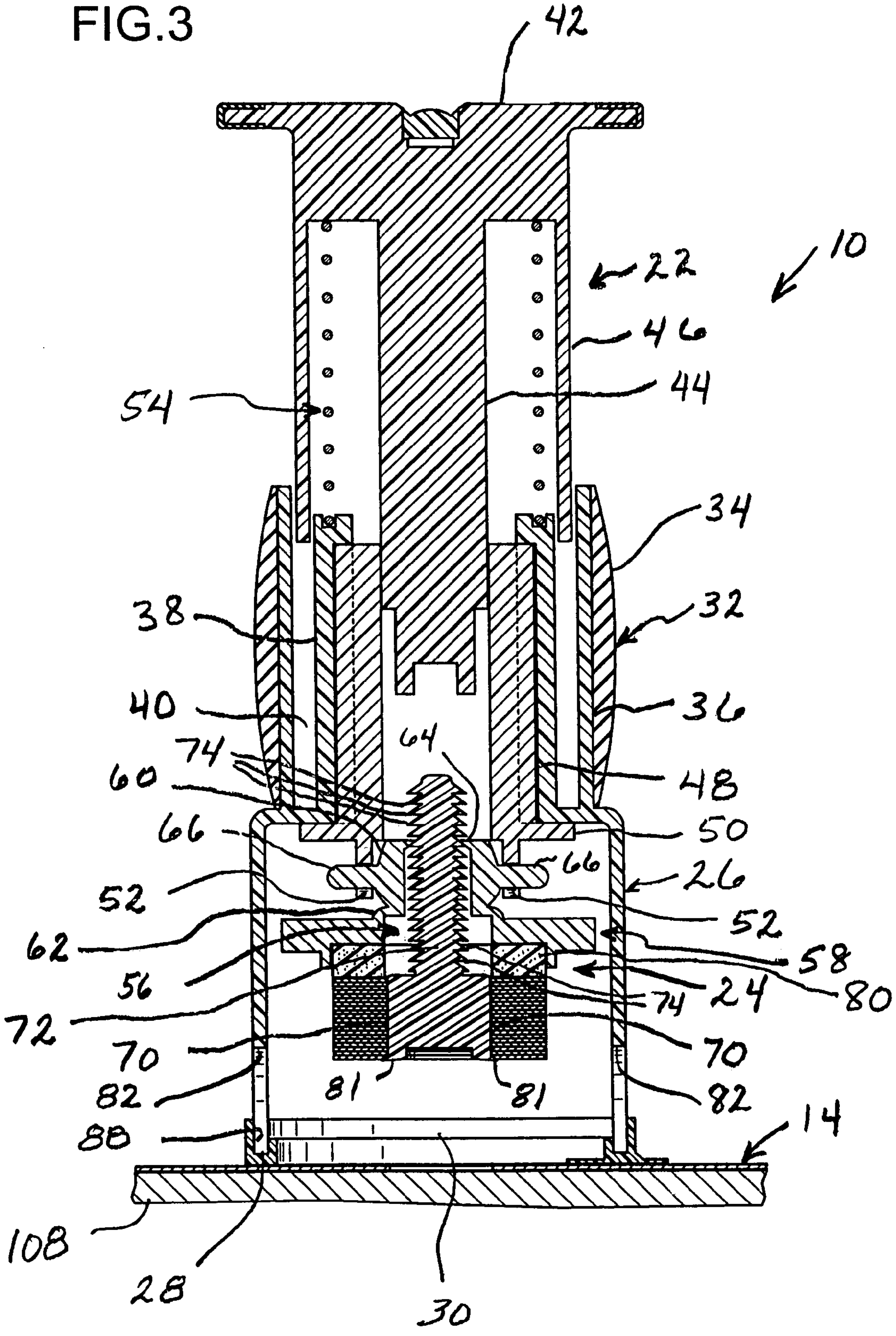
FIG. 3 is a sectional elevational view illustrating the handheld applicator of FIG. 1 in preparation for application of a reinforcement ring.

The handheld hole reinforcer ring applicator 10 is then positioned relative to a sheet of paper 14 or other sheet-like material in which holes 16 have been prepunched. That is, the applicator 10 is positioned so that the straight edges 93 of the visual edge alignment projections 92 are both in linear alignment with the straight, linear edge 94 of the sheet of paper 14. The edge alignment projections 92 are also equidistant from the aperture 16 in the sheet of paper 14 at which a reinforcing ring 12 is to be applied. The visual center alignment projection indicator 100 and pointer 102 aid in positioning the indexing guide 86 so that the cartridge 24 is located directly above the aperture 16 and in coaxial alignment therewith. Proper positioning of the handheld hole reinforcing ring applicator 10 in this manner is illustrated in FIGS. 1 and 3.

With the sheet of paper 14 located upon a rigid, underlying support 108, such as a desk or table, the cap 42 of the plunger 22 is manually pressed from above. The plunger 22 is thereupon telescopically forced into the base 20 from its extended position illustrated in FIG. 3 to a fully compressed position illustrated in FIG. 4. As the plunger cap 42 is pressed downwardly, the plunger guide tube 48 pushes downwardly on the ears 66 of the collar 60, thus firmly forcing the entire cartridge 24 downwardly until the lowermost reinforcing ring 12 is pressed firmly against the exposed upper surface of the sheet of paper 14, centered coaxially upon the aperture 16 defined therein.

Figure 4:
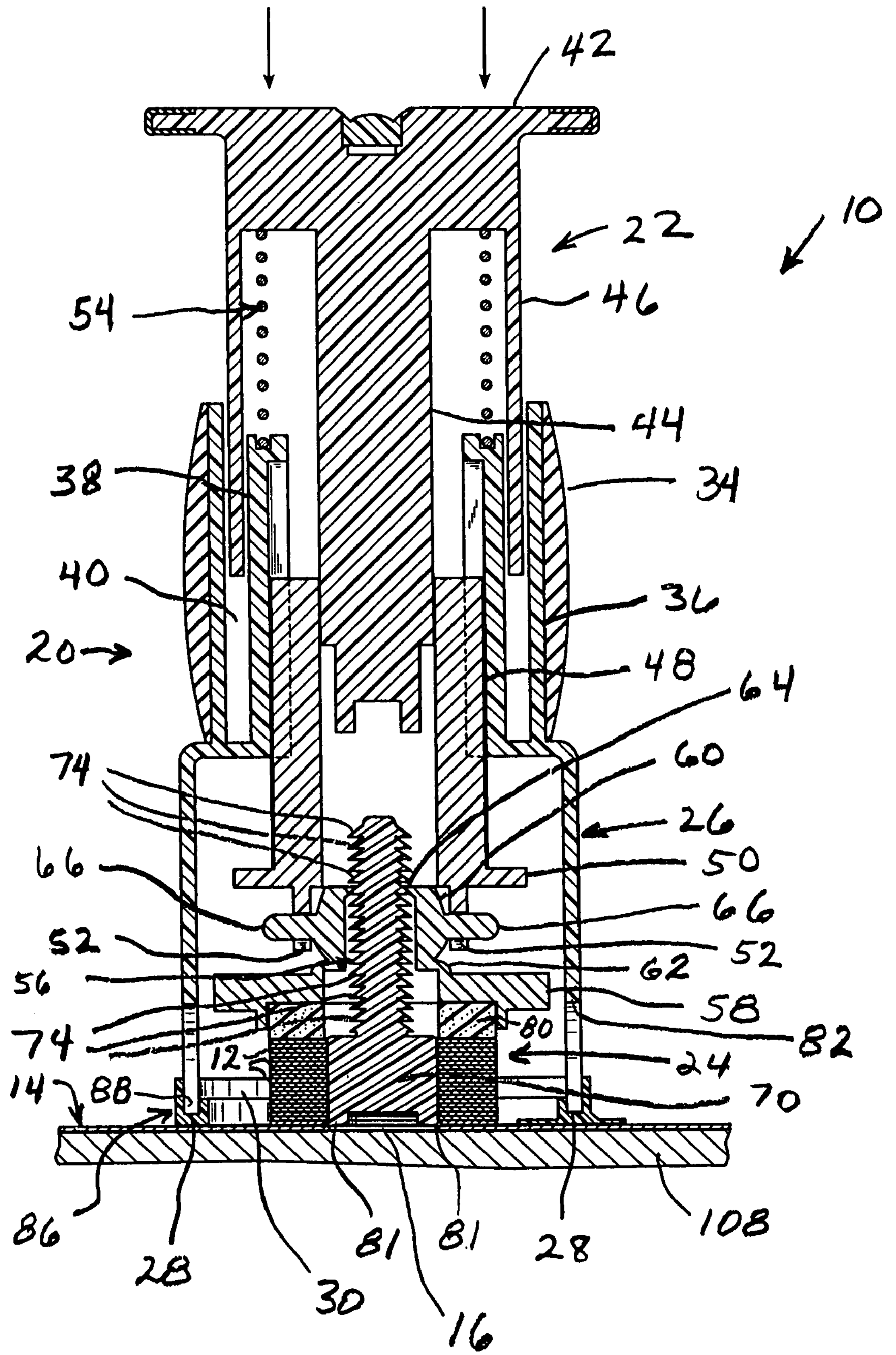
FIG. 4 illustrates the handheld applicator shown in FIG. 3 during application of a reinforcement ring to a sheet of material located therebeneath.

As the cartridge 24 is forced downwardly against the sheet of paper 14, as illustrated in FIG. 4, the rotatable connection between the collar ears 66 and the trunnions 52 ensures that the pressure pad 58 applies uniform pressure across the entire surface of the lowermost reinforcing ring 12. The resilient cushion 80 aids in ensuring uniform pressure distribution.

Figure 5:
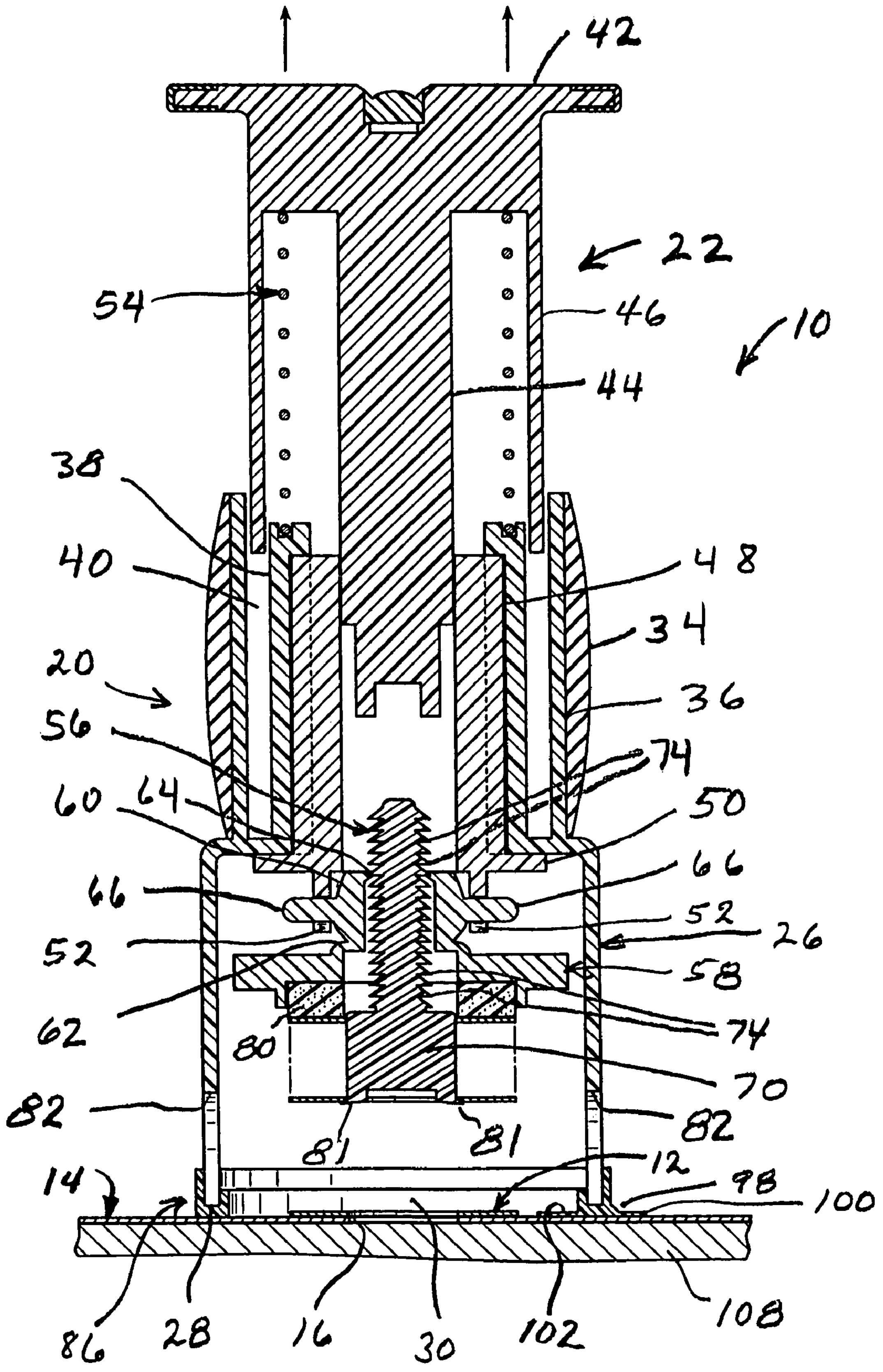
FIG. 5 illustrates retraction of the plunger of the applicator following application of the reinforcement ring as shown in FIG. 4.

As downward force is exerted, the structure of the reinforcing rings 12 is sufficiently flexible to allow the lowermost reinforcing ring 12 to pass over the out turned toes 81 at the lower extremities of the legs 78 as the core 56 of the cartridge 24 is forced incrementally up through the collar 60. That is, with each full depression of the plunger 22 to force the lowermost reinforcing ring 12 into tight, intimate, adhesive contact with the upper surface of the sheet of paper 14, the core 56 of the cartridge 24 is pushed upwardly slightly relative to the collar 60. With each application of a reinforcing ring 12, the core 56 is forced upwardly so that another annular barb 74 on the stem 72 is pushed up through the barb gripping flange 64 at the top of the collar 60. As the plunger 22 is released, the cartridge 24 is drawn back upwardly, away from the sheet of paper 14, as illustrated in FIG. 5.

Each of the reinforcing rings 12 has a release coating on its upper surface and an adhesive coating on its undersurface. Consequently, as the plunger 22 retracts the cartridge 24, as illustrated in FIG. 5, the force of adhesion between the underside of the lowermost reinforcing ring 12 is greater than the force of adhesion on its top side from the reinforcing ring 12 above. Therefore, the lowermost reinforcing ring 12 remains applied to the sheet of paper 14 in tight adhesive contact therewith concentrically about the hole 16, as illustrated in FIG. 5. With the application of each reinforcing ring 12 the core 56 is pushed upwardly stepwise so that another annular barb 74 is pushed through the barb gripping flange 64 with the application of each reinforcing ring 12. The number of reinforcing rings 12 in the stack of reinforcing rings retained by the out turned toes 81 decreases by one with the application of each reinforcing ring 12 to a sheet of paper 14 therebeneath.

Figure 6:
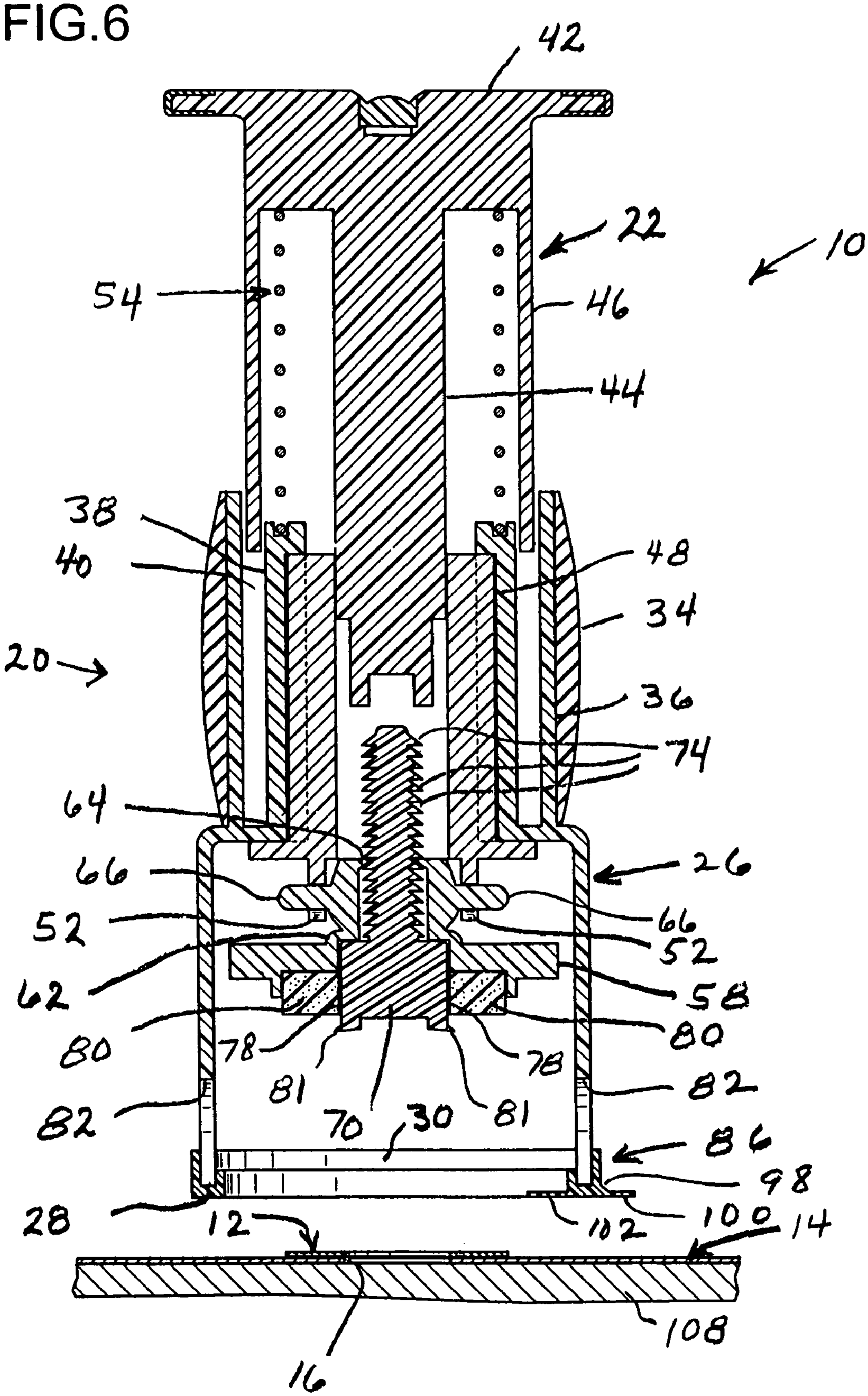
FIG. 6 illustrates a depleted cartridge and the unidirectional advancement of the cartridge core away from the mouth of the base as reinforcement rings are applied.

Ultimately, all of the reinforcing rings 12 will be applied and there will be no more reinforcing rings 12 retained on the core 56 by the out turned toes 81. At this point the stem 72 will be pushed all the way up as far it will go, as illustrated in FIG. 6.

Once the supply of reinforcing ring 12 on the cartridge 24 has been depleted, replacement with a new cartridge 24 is necessary. Replacement of a cartridge 24 is accomplished by inverting the applicator 10, depressing the plunger 22 fully against the force of the spring 54, and bringing the pressure plate or pad 58 approximately into alignment with the lower edge 28 of the lower portion 26 of the base 20. The user then grips the edges of the pressure pad 58 between the thumb and forefinger and pulls the pressure pad 58 of the spent cartridge 24 longitudinally away from the plunger 22. The ears 66 are thereupon popped out of the trunnion notches 52, thereby leaving the trunnion notches 52 free to receive the ears 66 of a replacement cartridge 24 fully loaded with a stack of reinforcing rings 12. The ears 66 of the fresh cartridge 24 are then pushed into the trunnion notches 52 in snap-fitting engagement therewith. The force on the plunger 22 is thereupon removed, thus returning the handheld reinforcing ring applicator 10 to the condition illustrated in FIGS. 1 and 3.

Undoubtedly, numerous variations and modifications of the invention will become readily apparent to those familiar with hole reinforcement ring applicator devices. For example, the construction of the plunger 22 can take a number of different forms. Rather than a friction fit between the plunger post 44 and the plunger tube 48, these members could be coupled together a twist lock or a threaded connection. Also, while the lower portion 26 of the base 20 is formed as a generally tubular, cylindrical, transparent structure in the preferred embodiment, it could be configured as a open framework stand having a plurality of depending feet. Other modifications of the invention are also possible. Accordingly, the scope of the invention should not be construed as limited to the specific embodiment depicted and described, but rather is defined in the claims appended hereto.

I claim:

1. A reinforcement ring applicator for sequentially applying a plurality of reinforcement rings from a stack of said rings each having an underside coated with a pressure-sensitive adhesive to sheet material therebeneath comprising:

a base formed with a hollow, tubular lower portion having a lower extremity forming an open mouth, and a hollow upper portion defining a plunger guide, a plunger mounted for longitudinal reciprocal movement and laterally constrained by said plunger guide of said base, a spring biasing said plunger away from said open mouth of said base, and a reinforcer cartridge releaseably coupled to said plunger wherein said cartridge has a central core with a lower member depending from a stem, and said lower member has a lower extremity with a plurality of turned out toes that support said stack of rings and said stem has outwardly projecting and downwardly inclined barbs defined thereon, and said cartridge is further comprised of an annular pressure pad disposed above said stack of reinforcing rings and a hollow, annular collar supported upon said pressure pad and defining a radially inwardly directed stem-engaging element that interacts with said stem to facilitate longitudinal passage of said barbs therethrough in a direction away from said pressure pad and to resist passage of said barbs therethrough in a direction toward said pressure pad.

2. A reinforcement ring applicator according to claim 1 wherein said radially inwardly directed stem-engaging element of said collar is an annular flange.

3. A reinforcement ring applicator according to claim 1 wherein said lower member of said core is formed with a plurality of legs upon which said turned out toes are formed, and said toes have outer, arcuately shaped peripheral edges.

4. A reinforcement ring applicator according to claim 3 wherein said plurality of legs is comprised of only a pair of diametrically opposed legs, each having a single toe defined thereon.

5. A reinforcement ring applicator according to claim 4 wherein a thin web located above said outwardly turned toes joins said legs together.

6. A reinforcement ring applicator according to claim 1 wherein said collar is provided with a pair of diametrically opposed, outwardly projecting ears and said plunger is formed with trunnions that releaseably engage said ears to permit said cartridge to undergo a rocking movement about said ears relative to said plunger.

7. A reinforcement ring applicator according to claim 6 further comprising a resilient cushion located between said pressure pad and said stack of reinforcers to equalize pressure applied by said pressure pad across the surfaces of said reinforcers.

8. A reinforcement ring applicator according to claim 1 wherein said lower portion of said base is formed of a column of transparent plastic which defines a pair of diametrically opposed finger access gaps therein.

9. A reinforcement ring applicator according to claim 1 further comprising a locator template at said mouth of said base, and said locator template is provided with opposing visual edge alignment projections to facilitate manual positioning of said base such that said cartridge resides at a predetermined distance from a straight edge of a sheet of material to be reinforced.

10. A reinforcement ring applicator according to claim 9 further comprising a visual centering projection directed midway between said edge alignment projections to indicate the center of axial alignment of said cartridge.

11. A handheld hole reinforcer for applying reinforcing rings about holes in sheets of material comprising:

a base having a hollow, lower chamber with a downwardly facing open mouth and a hollow, upper chamber, a plunger mounted in said base for reciprocal movement toward and away from said mouth of said base and having a lower end that includes a releaseable coupling thereon, a spring acting between said plunger and said base to urge said releaseable coupling away from said mouth of said base, and a cartridge having a central core with an upwardly projecting barbed stem with downwardly and outwardly inclined barbs formed thereon, and a plurality of longitudinally extending legs depending from said stem and having lower extremities with outwardly turned toes thereon supporting a supply of a plurality of reinforcing rings with pressure-sensitive adhesive coated on their undersides stacked atop one another, a transversely extending pressure pad located above said plurality of legs and having a central opening through which said stem passes, and an annular collar supported atop said pressure pad and releaseably engaged to said plunger by said releaseable coupling and defining a radially inwardly projecting stem gripping ring that permits advancement of said barbed stem in a direction away from said mouth of said base and retards advancement of said barbed stem in a direction toward said mouth of said base, whereby downward pressure on said plunger toward said mouth of said base permits stepped, incremental, longitudinal movement of said barbed stem through said gripping ring of said collar and toward said upper chamber of said base, thereby allowing said pressure pad to force the lowest reinforcement ring in said stack downwardly past said toes so as to adhere to a sheet of material located therebeneath.

12. A handheld hole reinforcer according to claim 11 wherein said annular collar has a pair of ears projecting in diametrically opposite radial directions and said releaseable coupling on said plunger is comprised of a pair of diametrically opposite slots which engage said ears on said collar with a snap fitting rotatable connection.

13. A handheld hole reinforcer according to claim 11 wherein said plunger includes a center post having upper and lower ends and a cylindrical, annular guide movable in sliding engagement within said upper chamber of said base, and said cylindrical, annular guide is secured to said lower end of said center post.

14. A handheld hole reinforcer according to claim 11 wherein said hollow lower chamber is formed by a transparent, cup-shaped member having a lower edge forming said downwardly facing open mouth and wherein a pair of diametrically opposing finger grip recesses are defined in said lower edge of said cup-shaped member to facilitate manual attachment and removal of said cartridge relative to said releaseable coupling.

15. A handheld hole reinforcer according to claim 14 further comprising an arcuate indexing guide releaseably attached to said lower edge of said cup-shaped member and including a pair of visual edge alignment projections linearly aligned with each other and projecting in mutually opposing directions at a spaced distance from said cartridge, thereby providing a visual alignment reference for positioning said base at a straight edge of a sheet of material located therebeneath.

16. A handheld hole reinforcer according to claim 15 wherein said indexing guide further includes a visual center alignment projection oriented perpendicular to said edge alignment projections and located equidistant therefrom.

17. A handheld hole reinforcer according to claim 16 wherein said indexing guide defines an upwardly facing channel that receives said lower edge of said cup-shaped member in frictional engagement therewith.

18. A handheld reinforcement ring applicator for applying reinforcing rings to sheets of material about apertures defined therein comprising:

a hollow base having a lower support defining a reinforcer application plane and an upper guide column defining a cylindrical, annular, upwardly facing guide channel therein oriented perpendicular to said reinforcer application plane, a plunger having a downwardly projecting, cylindrical, annular guide sleeve located in said guide channel and residing in laterally constrained, reciprocally movable engagement relative to said base, a spring interposed between said base and said plunger biasing said plunger upwardly, away from said reinforcer application plane, a reinforcer cartridge carrying a plurality of flat reinforcement rings each having a pressure-sensitive adhesive on its undersurface, and said cartridge is comprised of a transverse, annular pressure plate and a central core about which said plurality of reinforcement rings are coaxially mounted, and said central core is formed with a plurality of depending legs each having an outwardly facing toe at its lower extremity, and said reinforcement rings are supported from beneath upon said toes, and said reinforcement rings are sufficiently resilient so that they can be forced downwardly past said toes and free from said core one at a time to adhere to said sheets of material therebeneath about said apertures therein, and said core has an upwardly projecting shaft with downwardly and outwardly inclined barbs thereon, and said cartridge is further comprised of a collar mounted atop said pressure plate and releaseably coupled to said plunger and said collar has a central, axial aperture defined therein with a radially inwardly directed flange that surrounds and holds said core and eases unidirectional advancement of said barbs on said shaft of said core upwardly therewithin in a direction away from said reinforcer application plane.

19. A handheld reinforcement ring applicator according to claim 18 wherein said lower support of said base is formed as a hollow transparent, inverted cup-shaped structure having diametrically opposing finger access openings defined therein.

20. A handheld reinforcement ring applicator according to claim 18 wherein said plunger is provided with a releaseable coupling to said cartridge that allows said cartridge to rock about a transverse axis that is perpendicular to the direction of movement of said plunger relative to said base.

* * * * *